(12) United States Patent
Giefer et al.

(10) Patent No.: US 6,993,994 B2
(45) Date of Patent: Feb. 7, 2006

(54) GEAR INPUT UNIT

(75) Inventors: Andreas Giefer, Lemförde (DE); Jörg Meyer, Wagenfeld (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 0 days.

(21) Appl. No.: 10/939,937

(22) Filed: Sep. 13, 2004

(65) Prior Publication Data
US 2005/0028632 A1 Feb. 10, 2005

Related U.S. Application Data

(63) Continuation of application No. PCT/DE03/03382, filed on Oct. 9, 2003.

(30) Foreign Application Priority Data
Oct. 9, 2002 (DE) ............................... 102 47 068

(51) Int. Cl.
*B60K 20/00* (2006.01)

(52) U.S. Cl. .............................. 74/473.24; 192/219.5; 192/220.4

(58) Field of Classification Search ............... 74/473.2, 74/473.22, 472.23, 473.25, 473.3; 192/219.5, 192/220.2, 220.3, 220.4
See application file for complete search history.

(56) References Cited

U.S. PATENT DOCUMENTS

| 3,765,262 | A | * | 10/1973 | Mendenhall et al. .... 74/473.21 |
| 4,324,151 | A |  | 4/1982 | Rudy |
| 4,466,305 | A | * | 8/1984 | Hiraiwa et al. .......... 74/473.22 |
| 4,821,605 | A | * | 4/1989 | Dzioba ........................ 477/99 |
| 5,402,870 | A | * | 4/1995 | Osborn .................... 192/220.7 |
| 5,566,582 | A | * | 10/1996 | Beadle et al. ............ 74/473.19 |
| 5,582,073 | A | * | 12/1996 | Takeuchi et al. ......... 74/473.23 |
| 5,791,197 | A | * | 8/1998 | Rempinski et al. ...... 74/473.18 |
| 5,827,149 | A | * | 10/1998 | Sponable ..................... 477/92 |
| 6,325,196 | B1 | * | 12/2001 | Beattie et al. ........... 192/220.4 |
| 6,378,394 | B2 | * | 4/2002 | Kataumi et al. ........... 74/473.3 |
| 6,661,114 | B2 | * | 12/2003 | Syamoto .................... 307/10.1 |
| 2003/0097897 | A1 | * | 5/2003 | Yamada et al. .......... 74/473.21 |

FOREIGN PATENT DOCUMENTS

| DE | 86 29 219.6 | 4/1987 |
| DE | 197 14 495 A1 | 10/1998 |
| DE | 199 33 320 A1 | 2/2001 |
| DE | 101 26 129 A1 | 1/2002 |
| EP | 0 584 985 A1 | 3/1994 |
| EP | 1 062 439 | 9/1999 |
| EP | 1 018 612 A2 | 7/2000 |
| EP | 1 146 259 A2 | 10/2001 |

\* cited by examiner

*Primary Examiner*—David Fenstermacher
(74) *Attorney, Agent, or Firm*—McGlew & Tuttle, PC

(57) ABSTRACT

A blocking and releasing of actuating elements especially used in a manually shifted automatic transmission in vehicles for a manual gear input unit with a plurality of actuating elements, e.g., a selector lever and a button. A manual gear input unit (1) is selected for selecting gears with a first actuating element 2 for selecting at least one gear and with at least one additional actuating element 3 for setting additional functions. A detent pawl (6), which can be moved by means of an actuator 8 and by which the first actuating element and at least one additional actuating element 2, 3 can be locked and unlocked simultaneously, is provided.

28 Claims, 3 Drawing Sheets

GEAR INPUT UNIT

CROSS REFERENCE TO RELATED APPLICATION

This is a continuation of and claims the benefit (35 U.S.C. §120 and 365(c)) of copending International Application PCT/DE 03/003382 of Oct. 9, 2003, which designated inter alia the United States and which claims the priority of German Application DE 102 47 068.5 of Oct. 9, 2002. The entire contents of each application is hereby incorporated by reference in its entirety.

FIELD OF THE INVENTION

The present invention pertains to the blocking and releasing of actuating elements especially in a gear input unit for an automatic transmission in vehicles. The present invention pertains, in particular, to a manual gear input unit with a plurality of actuating elements, for example, a selector lever and a button.

BACKGROUND OF THE INVENTION

Automatic transmissions, which make available different gears, are used in the construction of vehicles. The gears—abbreviated by P, R, N and D (P=Park, R=Reverse, N=Neutral, D=Drive) can be selected by the driver with a selector lever or a button. In modern vehicles, the gear selected by the driver is scanned by means of a corresponding electronic unit and electronically transmitted to the transmission electronic unit, which adjusts the transmission correspondingly. The previously common mechanical connection between the transmission and the manual gear input unit (selector lever and/or button) is now eliminated. This concept is generally called "shift-by-wire shifting."

Shift-by-wire shifting has the basic problem that in case of emergency running of the transmission or failure of the electronic unit of the motor vehicle (failure of the transmission control device, failure of the shifting electronic unit, line break, failure of the power supply, etc.), the transmission is no longer able to carry out the driver's commands and the transmission is no longer able to be configured.

An optical, acoustic or haptic (tactile) feedback to the driver is known in such a situation from EP 1 062 439 B1. A haptic feedback is represented, for example, by an increase or reduction in the actuating force. Such haptic feedback, but also optical and acoustic feedbacks are not always reliably recognized by the driver, and they are even ignored in the worst case.

The blocking or fixing of the corresponding actuating element is a feedback that is guaranteed not to be able to be overlooked. As a result, the driver will immediately recognize that the desired setting of the transmission cannot be carried out or implemented.

Such a blocking of a single actuating element for conventional shifting mechanisms (cable or bar connection with the transmission) is known. The gears PARK and NEUTRAL are blocked under certain conditions especially in conventional automatic shifting mechanisms.

It is possible in shift-by-wire shifting mechanisms to split the selection of the different gears (P, R, N, D) between two or more actuating elements (for example, selector lever and button) or to incorporate additional actuating elements, which are not used to operate the transmission but have other functions, in the manual gear input unit.

SUMMARY OF THE INVENTION

The object of the present invention is therefore to provide a manual input unit that is a multicomponent input unit concerning the actuating elements, in which simultaneous blocking of all components can be carried out under certain boundary conditions.

The above-mentioned object is accomplished by means of a manual gear input for selecting gears with a first actuating element for selecting at least one gear and with at least one additional actuating element for setting additional functions according to the present invention. A detent pawl, which can be moved by means of an actuator and by which the first actuating element and at least one additional actuating element can be locked and unlocked simultaneously, is provided according to the present invention.

In particular, the gear input unit according to the present invention is designed such that at least two actuating elements differ in terms of their mode of operation.

The first actuating element may be a selector lever and the second actuating element a button.

The detent is arranged according to the present invention such that all actuating elements are locked and therefore cannot be actuated in a first position, and all actuating elements are unlocked and can be actuated in a second position of the detent pawl.

The first position is advantageously assumed under the action of a mechanical spring force and the second position by electric activation of the actuator.

In a preferred embodiment of the present invention, the selector lever is a monostable selector lever, which returns into its starting position after the manual deflection in at least one direction.

The button likewise returns into its starting position after it has been actuated.

The actuator is preferably an electromagnet for simple mode of operation of the gear input unit.

In another embodiment of the present invention, the gear input unit has a plurality of actuating elements, wherein a first part of these actuating elements can be locked and the other part can be simultaneously unlocked due to a corresponding arrangement relative to the detent pawl.

Other features, properties and advantages of the present invention will be explained now on the basis of exemplary embodiments and with reference to the accompanying drawing figures.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
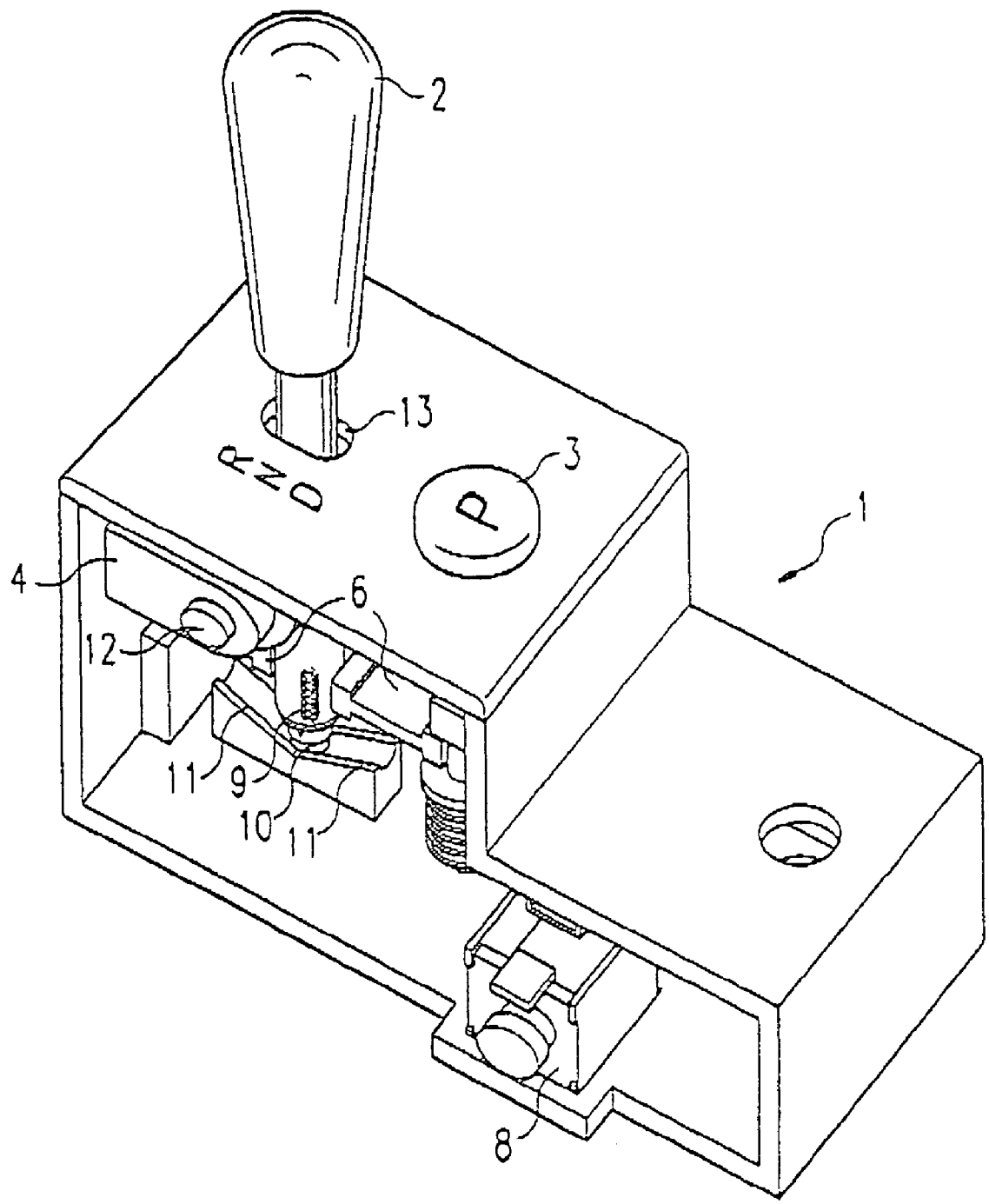
FIG. 1 is a perspective view obliquely from the front top side of a manual gear input unit according to the present invention with a selector lever partially integrated in a housing and with a button as actuating elements.
Figure 3:
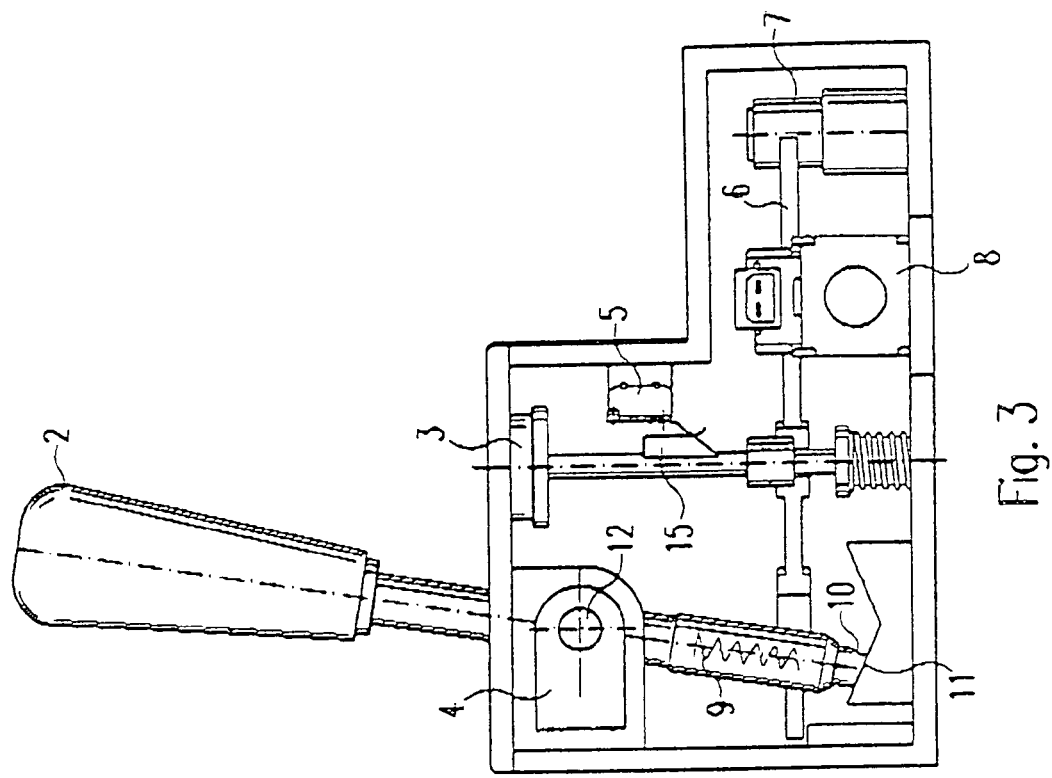
FIG. 3 is a schematic view showing a section through the most essential components of the manual gear input unit according to the present invention in the unlocked state and in the actuated state of both actuating elements.

Referring to the drawings in particular, FIG. 1 shows a perspective view obliquely from the front top side of an exemplary embodiment of a manual gear input unit 1 according to the present invention. The gear input unit 1 has two actuating elements in the form of a selector lever as well as a button 3 in this exemplary embodiment.

The lower end of the selector lever (locking pin 10) is pressed by a compression spring 9 integrated in the shaft of the lever against a wedge-shaped locking contour 11, so that the original middle position of the lever is again assumed after the deflection of the selector lever around the fulcrum point 12 of the selector lever. This behavior of the selector lever 2 is called monostable behavior, because the selector lever always assumes a preferred middle position. By tapping and hence deflecting the selector lever in the gate 13 integrated in the housing or the cover thereof in the forward or rearward direction, the driver is able to select another gear; for example, if the gear selected previously was N (NEUTRAL), R (REVERSE) can be selected by forward tapping and D (DRIVE) can be selected by rearward tapping. If the gear selected was D, the gear N can be selected by a single-time forward tapping, and the gear R can be selected by tapping twice. The gear selected last is scanned by a special scanning sensor system 4 for the selector lever and transmitted electronically to the transmission electronic unit.

The driver can select the gear P (PARK) independently from the setting of the selector lever by pressing the button 3. After the button 3 has been actuated, it likewise returns into its starting position.

Figure 2:
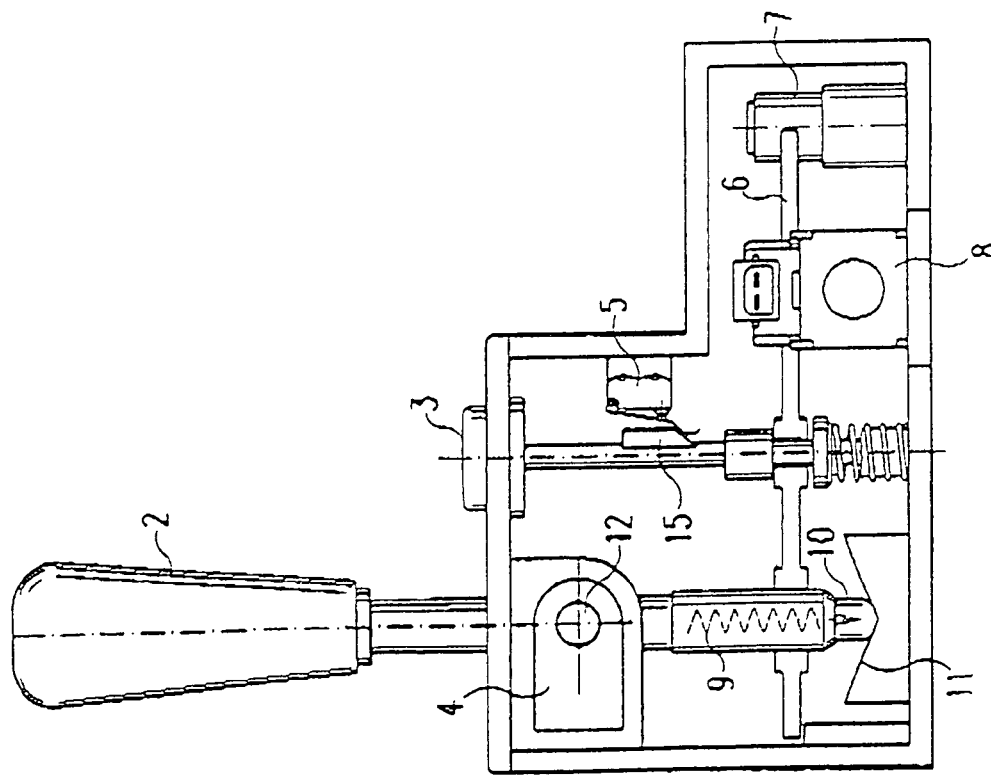
FIG. 2 is a schematic view showing a section through the most essential components of the manual gear input unit according to the present invention in the locked state of the two actuating elements.

FIG. 2 shows a side view of the manual gear input unit according to the present invention according to the above exemplary embodiment. The selector lever 2 is in the nondeflected state, and the button 3 is not activated. The shaft of the button 3 has a protuberance 15 at the level of a sensor 5. The sensor 5 has a contact lever, which is opened in the nonactivated state (FIG. 1) of the button 3. When the button is actuated, the protuberance 15 closes the contact lever of the sensor 5 (FIG. 2). The closing of the contact brings about the corresponding electric command to the transmission to assume the gear P (PARK) in this case.

In order to provide the driver with a reliable feedback that cannot be ignored that the actuation of the manual gear input unit no longer has any action, for example, in case of failure of the electric communication, a detent pawl 6, which is mounted pivotably at one end 7, is provided in the manual gear input unit. Due to the pivoting of the detent pawl 6, the detent pawl 6 engages the two actuating elements (selector lever 2 and button 3), so that these actuating elements 2, 3 are locked. The engagement is embodied in this exemplary embodiment by openings of the detent pawl 6 at the level of the shaft of the button as well as of the nondeflected selector lever shaft. However, the shaft of the particular actuating element may also have an opening, into which the detent pawl is pivoted. Blocking of the two actuating elements is ensured by the locking in such a way that the selector lever 2 cannot be moved any longer and the button 3 cannot be pressed any longer.

The pivoting of the detent pawl 6 is brought about by an actuator 8 (e.g., an electromagnet), on the one hand, and by a restoring spring, on the other hand. Consequently, the detent pawl 6 is practically also monostable, being so in such a way that the restoring spring brings about the mutual engagement of the detent pawl 6 with the actuating elements 2, 3 and consequently a locking in the nonenergized state of the manual gear input unit 1. The releasing position of the detent pawl 6 is preferably determined by the energized position of the actuator 8, so that the actuating elements 2, 3 are blocked by the purely mechanical restoring force of the restoring spring in case of failure of the energy supply (power supply).

Figure 4:
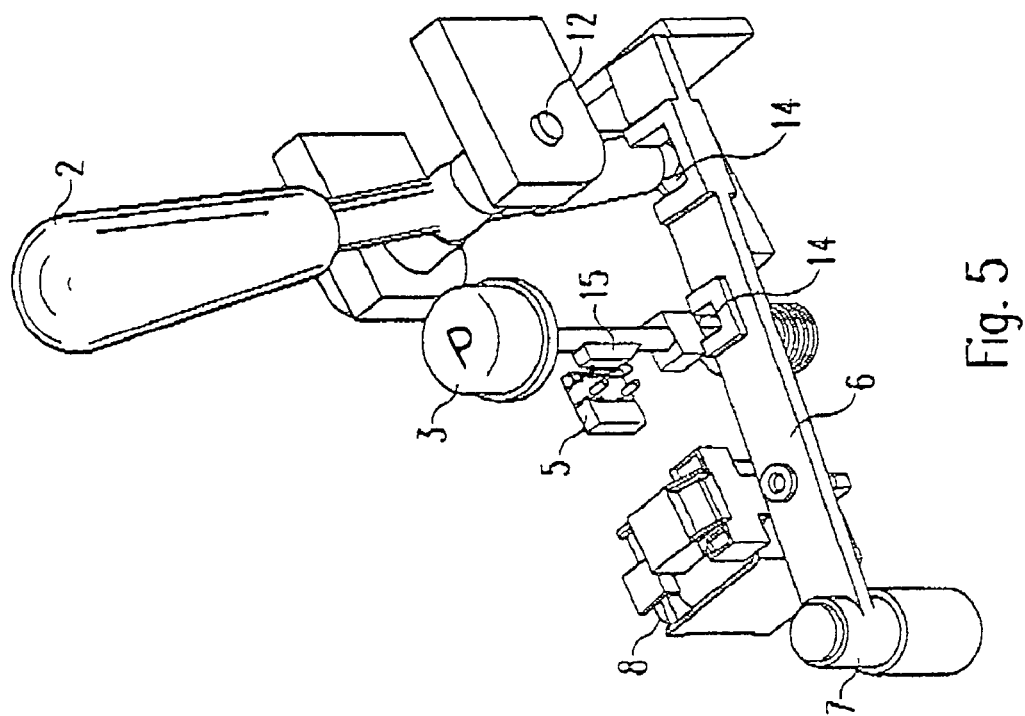
FIG. 4 is a perspective view obliquely from the rear of a manual gear input unit according to the present invention with a selector lever and a button as actuating elements without a housing in the locked state.
Figure 5:
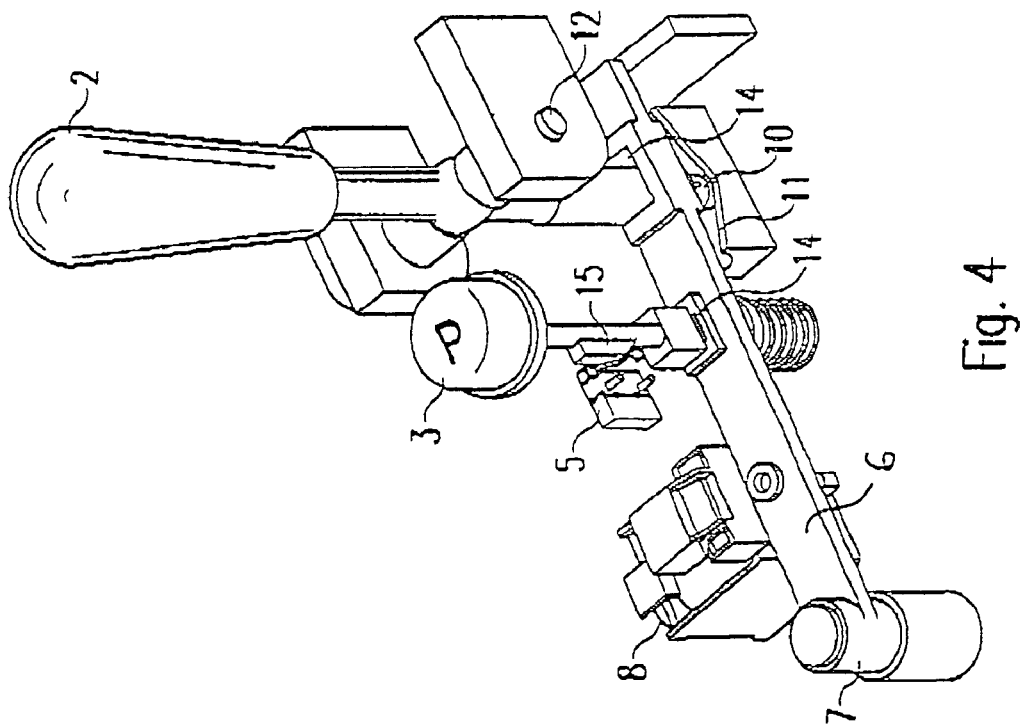
FIG. 5 is a perspective view obliquely from the rear of a manual gear input unit according to the present invention with a selector lever and a button as actuating elements without a housing in the unlocked state.

The mechanism according to the present invention for locking the two different actuating elements (selector lever 2 and button 3) is shown clearly in FIGS. 4 and 5:

The detent pawl 6 is arranged in FIG. 4 such that the openings 14 surround the shaft of the respective actuating element, so that the selector lever 2 cannot be deflected from its initial position any longer, on the one hand, and the button 3 cannot be pressed any longer, on the other hand. FIG. 4 shows the situation in which the electric energy supply is eliminated, in which case the engagement of the detent pawl with the actuating elements and the blocking of the said actuating elements are brought about by the pretension of a restoring spring. Tilting or tapping of the selector lever 2 and pressing of the button 3 are no longer possible in this state, as a result of which the driver is made aware of the fact that it is no longer possible to control the transmission and hence the gear selection.

FIG. 5 shows the situation in the case in which electric energy is present. By energizing the actuator 8, the detent pawl is deflected against the force of the restoring spring, and the shafts of both actuating elements are released so that tilting or tapping of the selector lever 2 as well as pressing of the button 3 are possible. Both actuating elements 2, 3 are activated, i.e., the selector lever 2 can be tilted and the button 3 can be pressed, the protuberance 15 closing the contact of the button sensor 5. Both the selector lever 2 is tilted and the button 3 is pressed in the view in FIG. 4 for illustration only, even though the simultaneous activation is rather unlikely in practice.

FIGS. 1 through 5 show only a possible embodiment of the present invention. It is just as possible to select all gears P, R, N, D by another design of the selector lever 3 (for example, by another gate or by additional selector levers), while another actuating element or additional actuating elements in general (for example, the button) do not necessarily have to be used to actuate the transmission. The individual actuating elements can now be blocked or released simultaneously in a corresponding grouping. For example, an embodiment with two selector levers would be possible, in which case the gears P, R, N, D can be engaged with one lever and the gears can be shifted manually with the other selector lever (e.g., stepwise shifting of the gears 1 through 5). However, it is also possible to select all gears by means of a plurality of buttons (one button each for P, R, N and D), which are blocked or released under certain conditions.

While a specific embodiment of the invention has been shown and described in detail to illustrate the application of the principles of the invention, it will be understood that the invention may be embodied otherwise without departing from such principles.

What is claimed is:

1. A manual gear input unit for selecting gears, said unit comprising:
   a first actuating element for selecting at least one gear; and
   an additional actuating element for setting additional functions;
   a detent pawl;
   an actuator moving said detent pawl for simultaneously locking and unlocking said first actuating element and said additional actuating element with said detent pawl.

2. A manual gear input unit in accordance with claim 1, wherein said first actuating is for a first mode of operation and said additional actuating element is for another mode of operation.

3. A manual gear input unit in accordance with claim 1, wherein said first actuating element is a selector lever and said additional actuating element is a button.

4. A manual gear input unit in accordance with claim 1, wherein said detent pawl is arranged to lock said first actuating and said additional actuating element to not be actuated in a first position of said detent pawl and to unlock said first actuating element and said additional actuating element allowing actuation in a second position of said detent pawl.

5. A manual gear input unit in accordance with claim 4, wherein said detent pawl assumes said first position based on the force of a mechanical spring and assumes said second position by the electric activation of said actuator.

6. A manual gear input unit in accordance with claim 5, wherein said first actuating element is a selector lever that is a monostable selector lever, which returns into a starting position after manual deflection in at least one direction.

7. A manual gear input unit in accordance with claim 5, wherein said additional actuating element is a button and said button returns into a starting position after actuation.

8. A manual gear input unit in accordance with claim 1, wherein said actuator is an electromagnet.

9. A manual gear input unit in accordance with claim 1, wherein a first part of said actuating elements can be locked and another part can be simultaneously unlocked due to a corresponding arrangement in relation to said detent pawl.

10. A manual gear input unit for selecting gears, said unit comprising:
    a first actuating element comprising a selector lever movable from a first position into a deflected position, said actuating element for selecting at least one gear, said selector lever including an engagable part; and
    a second actuating element with a mechanically movable part with an engagable part, said second actuating element providing a different mode of operation from said first actuating element;
    a mechanical locking and unlocking element movable into a locking position engaging both said first actuating element engagable part and said second actuating element engagable part in said locking position for locking said first actuating element and said second actuating element and movable into an unlocked position in which said first actuating element and said second actuating element are unlocked to allow actuation; and
    an actuator for moving said mechanical locking and unlocking element at least from said locking position to said unlocked position or said unlocked position to said locking position.

11. A manual gear input unit in accordance with claim 10, wherein said mechanically movable part of said second actuating element comprises a button.

12. A manual gear input unit in accordance with claim 11, wherein said mechanical locking and unlocking element is arranged to lock said first actuating and said second actuating element to not be actuated in a first position of said mechanical locking and unlocking element and to unlock said first actuating element and said second actuating element allowing actuation in a second position of said mechanical locking and unlocking element.

13. A manual gear input unit in accordance with claim 12, further comprising a mechanical spring and an electric actuator, wherein said mechanical locking and unlocking element assumes said first position based on the force of said mechanical spring and assumes said second position by the electric activation of said electric actuator.

14. A manual gear input unit in accordance with claim 13, wherein said selector lever that is a monostable selector lever, which returns into said first position as a starting position after manual deflection in at least one direction.

15. A manual gear input unit in accordance with claim 14, further comprising button bias means for urging said button in a direction, wherein said button returns into a starting position after actuation.

16. A manual gear input unit in accordance with claim 15, wherein said actuator is an electromagnet.

17. A manual gear input unit in accordance with claim 16, wherein a first part of said actuating elements can be locked and another part can be simultaneously unlocked due to a corresponding mechanical arrangement in relation to said mechanical locking and unlocking element.

18. A manual gear input unit for selecting gears, said unit comprising:
    a first actuating element comprising a selector lever deflectable around a fulcrum point for selecting at least one gear; and
    a second actuating element for setting additional functions;
    a detent pawl;
    an actuator moving said detent pawl for simultaneously locking and unlocking said first actuating element and said second actuating element, said detent pawl being arranged to lock said first actuating and said second actuating element to not be actuated in a first position of said detent pawl and to unlock said first actuating element and said second actuating element allowing actuation in a second position of said detent pawl, wherein said detent pawl assumes said first position based on the force of a mechanical spring and assumes said second position by the electric activation of said actuator.

19. A manual gear input unit in accordance with claim 18, wherein said second actuating element is a button which is pressed for setting additional functions.

20. A manual gear input unit in accordance with claim 19, wherein said button is spaced form said selector lever.

21. A manual gear input unit in accordance with claim 20, wherein said detent pawl has engagement openings defining surfaces for locking said first actuating and said second actuating element in said first position.

22. A manual gear input unit in accordance with claim 21, wherein said actuator includes an electric actuator and a mechanical restoring spring is provided, wherein said detent pawl is pivotably mounted wherein said first actuating and said second actuating element are both engaged by said detent pawl upon pivoting said detent pawl into the first position and energizing said electric actuator causes said detent pawl to be deflected against the force of said mechanical restoring spring.

23. A manual gear input unit in accordance with claim 22, wherein said button has a button shaft engaged by one of the openings in said detent pawl in said first position and said selector lever has a selector shaft engaged by one of the openings in said detent pawl in said first position, with said selector lever in a non deflected position.

24. A manual gear input unit in accordance with claim 23, wherein said button shaft has a larger dimension portion and a smaller dimension portion, said detent pawl engaging said button shaft at a side of larger dimension opposite to said button.

25. A manual gear input unit in accordance with claim 24, wherein said selector lever is mounted as a monostabe selector lever returning to a stable position after being released from being deflected to a deflected position in at least one direction.

26. A manual gear input unit in accordance with claim 11, wherein:

said button is spaced form said selector lever; and said selector lever is mounted as a monostabe selector lever returning to a stable position after being released from being deflected to a deflected position in at least one direction.

27. A manual gear input unit in accordance with claim 26, wherein said second actuating element engagable part is a button shaft wherein said mechanical locking and unlocking element is detent pawl with an opening defining surfaces engaging said selector lever engagable part for locking said first actuating element and an opening defining surfaces engaging said button shaft.

28. A manual gear input unit in accordance with claim 27, wherein said button shaft has a larger dimension portion and a smaller dimension portion, said detent pawl engaging said button shaft at a side of larger dimension opposite to said button.

* * * * *